United States Patent [19]

Kobayashi et al.

[11] Patent Number: 5,148,019
[45] Date of Patent: Sep. 15, 1992

[54] MOVING AMOUNT DETECTING METHOD USING A SHADOW PICTURE DIFFRACTION INTERFERENCE PATTERN

[75] Inventors: Hiroshi Kobayashi, Kodaira; Haruhiko Machida; Jun Akedo, both of Tokyo; Tomoyuki Yamaguchi, Chiba, all of Japan

[73] Assignee: Ricoh Company Ltd., Tokyo, Japan

[21] Appl. No.: 631,093

[22] Filed: Dec. 19, 1990

[30] Foreign Application Priority Data

Dec. 22, 1989 [JP] Japan .................................. 1-333650

[51] Int. Cl.⁵ ............................................. G01D 5/34
[52] U.S. Cl. ........................... 250/231.14; 250/237 G; 250/231.18
[58] Field of Search ............ 250/231.13, 231.14, 250/231.16, 231.18, 237 G; 356/374

[56] References Cited

U.S. PATENT DOCUMENTS

| | | | |
|---|---|---|---|
| 3,812,352 | 5/1974 | MacGovern | 250/237 G |
| 4,218,615 | 8/1980 | Zinn, Jr. | 250/231.16 |
| 4,823,001 | 4/1989 | Kobayashi et al. | 250/237 G |
| 4,874,941 | 10/1989 | Spillman, Jr. | 250/237 G |
| 4,912,322 | 3/1990 | Ichikawa | 250/237 G |
| 4,943,716 | 7/1990 | Ichikawa et al. | 250/237 G |
| 4,948,968 | 8/1990 | Matsui | 250/231.14 |
| 4,950,891 | 8/1990 | Matsui | 250/237 G |
| 4,983,825 | 1/1991 | Ichikawa et al. | 250/237 G |
| 4,987,299 | 1/1991 | Kobayashi et al. | 250/231.14 |
| 4,987,302 | 1/1991 | Meyer et al. | 250/231.14 |

FOREIGN PATENT DOCUMENTS

390489A1 8/1989 Fed. Rep. of Germany .
WO86/03833 7/1986 PCT Int'l Appl. .

Primary Examiner—David C. Nelms
Assistant Examiner—John R. Lee
Attorney, Agent, or Firm—Fish & Richardson

[57] ABSTRACT

In a method for detecting a moving amount of a detected body, light emitted from a light source is irradiated onto the detected body and light reflected from the detected body or light transmitted therethrough is detected by a photodetector. This method has the steps of emitting incoherent light from the light source through a small opening of a light-interrupting plate; irradiating the incoherent light onto the detected body having a monoperiodic structure to obtain a divergent transmitting or reflecting light beam; forming a shadow picture diffraction-interference pattern by the divergent transmitting or reflecting light beam; and detecting a moving amount of the shadow picure diffraction-interference pattern caused by a movement of the detected body in a direction crossing the irradiated light beam by the photodetector to detect the moving amount of the detected body.

7 Claims, 3 Drawing Sheets

MOVING AMOUNT DETECTING METHOD USING A SHADOW PICTURE DIFFRACTION INTERFERENCE PATTERN

BACKGROUND OF THE INVENTION

1. Field of the Invention

The present invention relates to a moving amount detecting method widely used in various kinds of encoders, etc.

2. Description of the Related Art

The moving amount of a detected body is detected by irradiating light from a light source to the detected body and detecting light reflected from the detected body or light transmitted therethrough using a photodetector. Such detection is widely performed and constitutes one kind of optical instrumentations.

The inventors of this application proposed a method for detecting a displacement amount, etc. of the detected body in Japanese Patent Application No. 63-127916. In this method, a light beam from a light source emitting coherent light is irradiated onto the detected body having a periodic structure so as to form a shadow picture pattern by diffraction. The displacement amount of the detected body is detected by using this shadow picture pattern.

However, in this method, the light source is limited to a source from which the coherent light is emitted. Therefore, the cost of a measuring device tends to be increased.

There is another known method for detecting a moving amount, etc. of the detected body by irradiating an incoherent light beam emitted from an LED onto the detected body having a monoperiodic structure. Such a method is described in e.g., "Sensor-Interfacing" (S61) No. 3, P. 29 published by CQ publishing company. In this method, when a pitch of the monoperiodic structure of the detected body is reduced to improved the accuracy in measurement, an S/N ratio of a signal obtained by the photodetector is greatly reduced so that it is difficult to measure the moving amount, etc. of the detected body with high accuracy.

SUMMARY OF THE INVENTION

It is therefore an object of the present invention to provide a novel moving amount detecting method in which a device for emitting incoherent light can be used as a light source and the moving amount of a detected body can be measured with high accuracy.

The above object of the present invention can be achieved by a method for detecting a moving amount of a detected body by irradiating light emitted from a light source onto the detected body and detecting light reflected from the detected body or light transmitted therethrough by a photodetector, the method comprising the steps of emitting incoherent light from the light source through a small opening of a light-interrupting plate; irradiating the incoherent light onto the detected body having a monoperiodic structure to obtain a divergent transmitting or reflecting light beam; forming a shadow picture diffraction-interference pattern by the divergent transmitting or reflecting light beam; and detecting a moving amount of the shadow picture diffraction-interference pattern caused by a movement of the detected body in a direction crossing the irradiated light beam by the photodetector to detect the moving amount of the detected body.

Further the above object of the present invention can be achieved by a method for detecting a moving amount of a detected cylindrical body by irradiating light emitted from a light source onto the detected body and detecting light reflected from the detected body by a photodetector, the method comprising the steps of emitting incoherent light from the light source through a small opening of a light-interrupting plate; irradiating the incoherent light through a collimator lens onto the detected body having a monoperiodic structure to obtain a divergent reflecting light beam; forming a shadow picture diffraction-interference pattern by the divergent reflecting light beam; and detecting a moving amount of the shadow picture diffraction-interference pattern caused by a movement of the detected body in a direction crossing the irradiated light beam by the photodetector to detect the moving amount of the detected body.

In accordance with the above structure, a device for emitting incoherent light can be used as a light source and a moving amount of the detected body can be measured with high accuracy.

Further objects and advantages of the present invention will be apparent from the following description of the preferred embodiments of the present invention as illustrated in the accompanying drawings.

DESCRIPTION OF THE PREFERRED EMBODIMENTS

Figure 1:
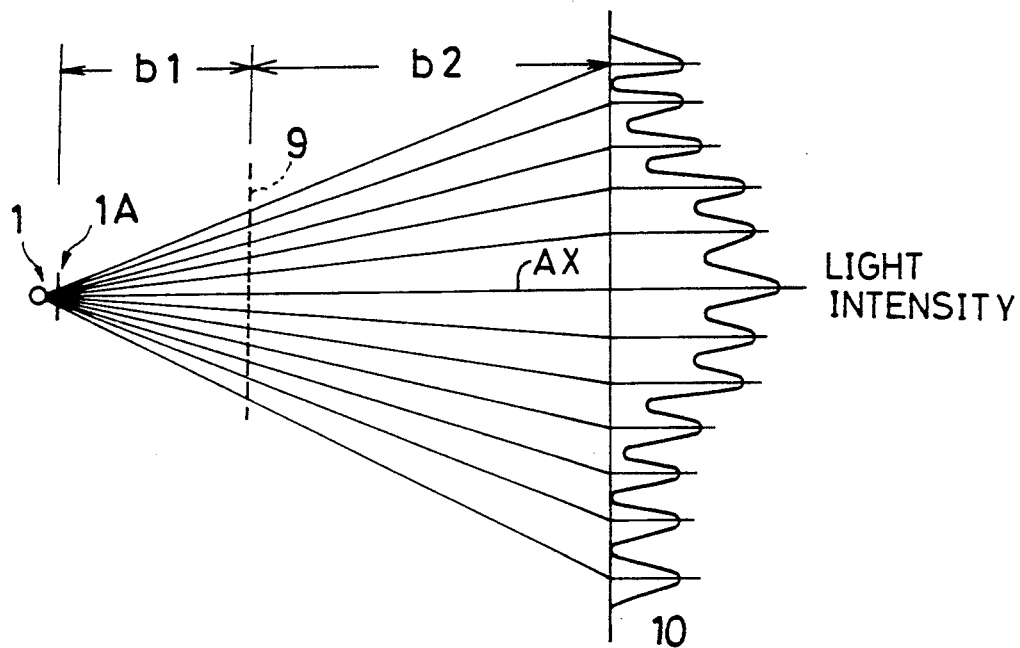
FIG. 1 is a view for explaining the principle of a moving amount detecting method in the present invention.

The preferred embodiments of a moving amount detecting method in the present invention will next be described in detail with reference to the accompanying drawings.

In a moving amount detecting method of the present invention, the moving amount of a detected body is detected by irradiating light emitted from a light source onto the detected body and detecting light reflected from the detected body or light transmitted therethrough by a photodetector. The moving amount detecting method has the following features.

Namely, incoherent light is emitted from the light source and is transmitted through a small opening of a light-interrupting plate. The incoherent light is irradiated onto the detected body having a monoperiodic structure to obtain a divergent transmitting or reflecting light beam. A shadow picture diffraction-interference pattern is formed by the divergent transmitting or reflecting light beam. A moving amount of the shadow picture diffraction-interference pattern caused by a movement of the detected body in a direction crossing the irradiated light beam is detected by the photodetector to detect the moving amount of the detected body.

To form the shadow picture diffraction-interference pattern, it is necessary that the light beam transmitted through the detected body or the light beam reflected therefrom is divergent. To satisfy this condition, it is generally sufficient to irradiate the incoherent light beam transmitted through the small opening of the light-interrupting plate onto the detected body as a divergent light beam as it is. When the detected body has a projected face, the divergent reflecting light beam can be obtained even when a parallel light beam is irradiated onto the detected body. Accordingly, when the detected body has a projected face, it is sufficient to change the incoherent light beam transmitted through the small opening of the light-interrupting plate by a collimator lens to a parallel light beam and irradiate this parallel light beam onto the detected body.

The small opening of the light-interrupting plate can be formed in rectangular, elliptical, circular shapes, etc.

The monoperiodic structure means that a periodic structure has one constant pitch.

The light source emitting the incoherent light can be constructed by an LED or a light source for emitting white light.

As explained in Japanese Patent Application No. 63-127916 mentioned above, when a coherent light beam from a linear light source is irradiated onto the detected body having a monoperiodic structure, it is possible to provide a shadow picture pattern corresponding to the monoperiodic structure of the detected body.

In accordance with researches of the inventors, it is found that a shadow picture diffraction-interference pattern corresponding to the monoperiodic structure of the detected body is also formed by irradiating incoherent light emitted from a light source onto the detected body through a small opening of the light-interrupting plate. This shadow picture diffraction-interference pattern is moved as a shadow picture in accordance with a movement of the detected body.

In FIG. 1 showing the principle of a moving amount detecting method in the present invention, a light source 1 emits incoherent light. Reference numerals 1A, 9 and 10 respectively designate a light-interrupting plate, a diffraction grating and a screen. The diffraction grating 9 is of a transmission type and is constructed by a one-dimensional linear grating such that the linear grating is arranged in a vertical direction in FIG. 1.

Figures 2A, 2B, 2C:
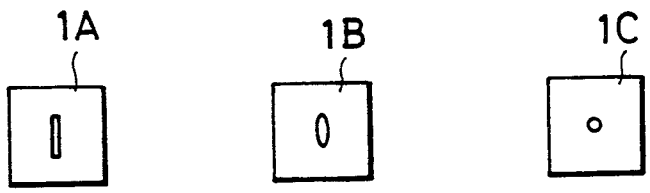
FIGS. 2a to 2c are views showing three kinds of light-interrupting plates.

As shown in FIG. 2a, a rectangular opening is formed in the light-interrupting plate 1A. A longitudinal direction of this opening is set to the vertical direction in FIG. 1.

The length of the opening of the light-interrupting plate 1A in the longitudinal direction thereof is set to d and a pitch of the diffraction grating 9 is set to $\xi$. A slit is disposed as a light transmitting portion in the diffraction grating 9.

As shown in FIG. 1, the distance between the light-interrupting plate 1A and the diffraction grating 9 is set to b1. The distance between the diffraction grating 9 and the screen 10 is set to b2.

When a light beam is emitted from the light source 1, a light intensity distribution is formed on the screen 10 as shown in FIG. 1 and has strong and weak patterns with respect to light intensity. At this time, a perpendicular line is drawn from a center of the opening in the longitudinal direction thereof to the screen 10 through the diffraction grating 9. This perpendicular line is called an optical axis AX in the following description.

The position of each peak of the light intensity distribution on the screen 10 is in conformity with a position in which light emitted from a central portion of the opening in the longitudinal direction thereof is considered to be a ray and each ray reaches the screen 10 through the slit of the diffraction grating 9.

Accordingly, the light intensity distribution on the screen 10 corresponds to a pattern provided by projecting a slit distribution of the diffraction grating 9 as a shadow picture on the screen 10 by a point source located in the center of the opening. Therefore, a pattern of this light intensity distribution is called a shadow picture diffraction-interference pattern. This pattern is formed as the results of a diffraction-interference phenomenon and therefore is not formed by a simple phenomenon of the shadow picture. With respect to this pattern, it should be also understood that the light intensity is strong in the vicinity of the optical axis AX and is weak in a position separated from the optical axis AX. Therefore, this pattern is especially called the shadow picture diffraction-interference pattern.

This shadow picture diffraction-interference pattern has the following features.

With respect to the pitch $\xi$ and the length d, no shadow picture pattern having a sufficient contrast between light and shade can be obtained when a ratio $d/\xi$ is greater than 4, i.e., when the length d of the opening in the longitudinal direction thereof is greater than a value quadruple the pitch $\xi$ of the diffraction grating. In contrast to this, when the ratio $d/\xi$ is reduced and approaches zero, the shadow picture diffraction-interference pattern is formed in accordance with a condition for forming a shadow picture diffraction pattern described in Japanese Patent Application Laying Open (KOKAI) No. 63-47616. Namely, when the ratio $d/\xi$ is less than 1/10, the features of a point source appear and the shadow picture diffraction-interference pattern becomes unstable with respect to the changes in distances b1 and b2.

The relation between the size of the shadow picture diffraction-interference pattern and the slit pitch $\xi$ of the diffraction grating 9 will next be described. The distance between peaks of the shadow picture diffraction-interference pattern is provided as $\xi$ (b2/b1+b2). This relation $\xi$ (b2/b1+b2) is formed in considerable wide regions of the distances b1 and b2. The formation of this relation with respect to the shadow picture is confirmed by an experiment. Accordingly, the shadow picture diffraction-interference pattern is very stably formed and the size thereof can be suitably set in a considerable range by the pitch $\xi$ and the ratio (b2/b1+b2).

As mentioned above, the shadow picture diffraction-interference pattern is formed by diffraction and interference and corresponds as a shadow picture to the light transmitting or reflecting portion in the diffraction grating. The shadow picture diffraction-interference pattern is moved in accordance with a movement of the diffraction grating. Accordingly, when a monoperiodic structure of the detected body is used as the diffraction grating and the movement of the formed shadow picture diffraction-interference pattern is detected by a photodetector as a periodic change in quantity of received light, it is possible to know a moving amount of the detected body by a corresponding relation between the shadow picture diffraction-interference pattern and the monoperiodic structure.

The light-interrupting plate 1A has the rectangular opening in the above embodiment. However, as shown in FIG. 2b, the light-interrupting plate may be constructed by a light-interrupting plate 1B having an elliptical opening. Further, as shown in FIG. 2c, the light-interrupting plate may be constructed by a light-interrupting plate 1C having a circular opening. In the case of the elliptical opening, it is sufficient to set a length of the elliptical opening on a major axis thereof to satisfy the above condition with respect to the pitch $\xi$. In the case of the circular opening, it is sufficient to set a diameter d of the circular opening to satisfy the above condition with respect to the pitch $\xi$.

Figure 3:
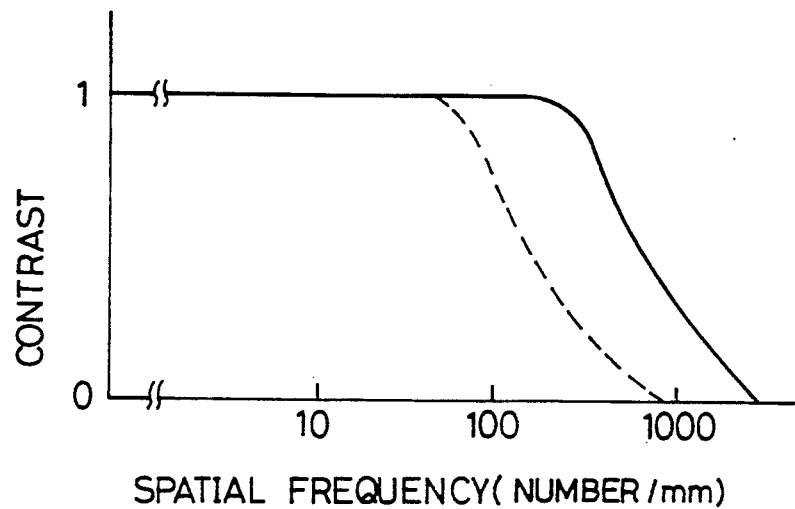
FIG. 3 is a view for explaining effects of one light-interrupting plate and showing the relation between contrast and a spatial frequency of a monoperiodic structure of a detected body.

In FIG. 3, a solid line shows a case in which the light-interrupting plate having a small opening is disposed, and a broken line shows a case in which there is no light-interrupting plate. When a spatial frequency of the monoperiodic structure of the detected body is small, the shadow picture diffraction-interference pattern can be obtained even when a light beam from an LED is directly irradiated onto the detected body. However, the contrast between light and shade of the shadow picture diffraction-interference pattern is rapidly reduced when the spatial frequency is increased as shown in FIG. 3. In contrast to this, when light transmitted through the small opening of the light-interrupting plate is irradiated onto the detected body as in the present invention, it is possible to obtain the shadow picture diffraction-interference pattern having a high contrast between light and shade until a very high spatial frequency as shown in FIG. 3.

A moving amount detecting method in each of first to fourth concrete embodiments of the present invention will next be described.

Figure 4:
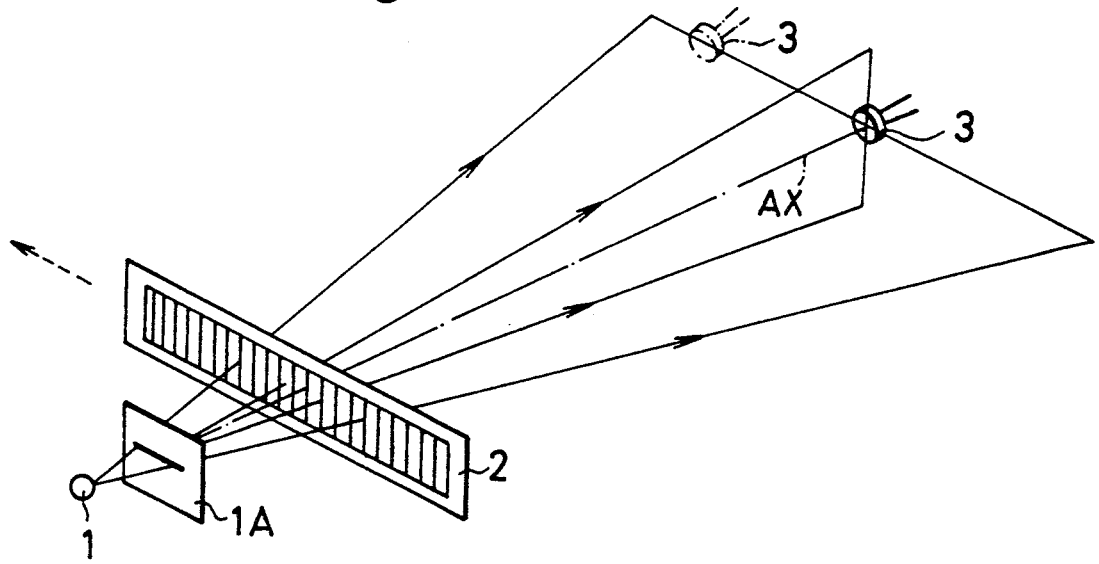
FIG. 4 is a view for explaining a moving amount detecting method in a first embodiment of the present invention.

FIG. 4 shows a moving amount detecting method in the first embodiment of the present invention. In this first embodiment, the moving amount detecting method is applied in the detection of a moving amount of a linear encoder 2.

In FIG. 4, a light source 1 emits incoherent light and is constructed by an LED, etc.

A linear encoder 2 is used as a detected body and is formed by arranging small slits at a constant pitch $\xi$. A shadow picture diffraction-interference pattern formed by this slit arrangement is moved in accordance with a movement of the linear encoder 2 in the direction of an arrow in FIG. 4. Accordingly, when a moving amount of the shadow picture diffraction-interference pattern is detected as a periodic change in quantity of received light by a photodetector 3 disposed in a constant position, it is possible to detect the moving amount of the linear encoder 2 with high accuracy by a magnification relation (formed by the above ratio b2/b1+b2) between the linear encoder and the shadow picture diffraction-interference pattern.

Figure 5:
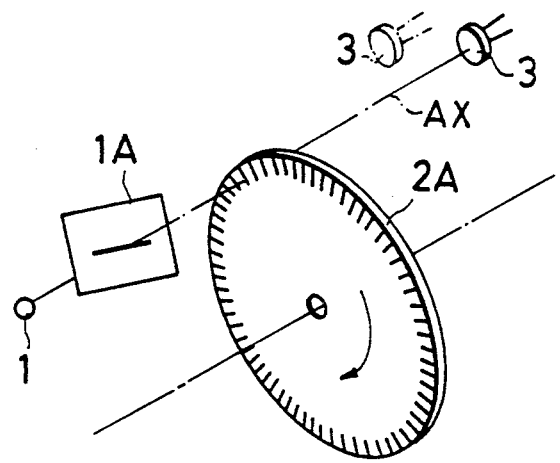
FIG. 5 is a view showing only a main portion of a moving amount detecting method in a second embodiment of the present invention.

FIG. 5 shows a moving amount detecting method in the second embodiment of the present invention. In FIG. 5, the moving amount detecting method is applied in the measurement of a moving amount of a disc-type diffraction grating 2A when this diffraction grating is rotated.

Figure 6:
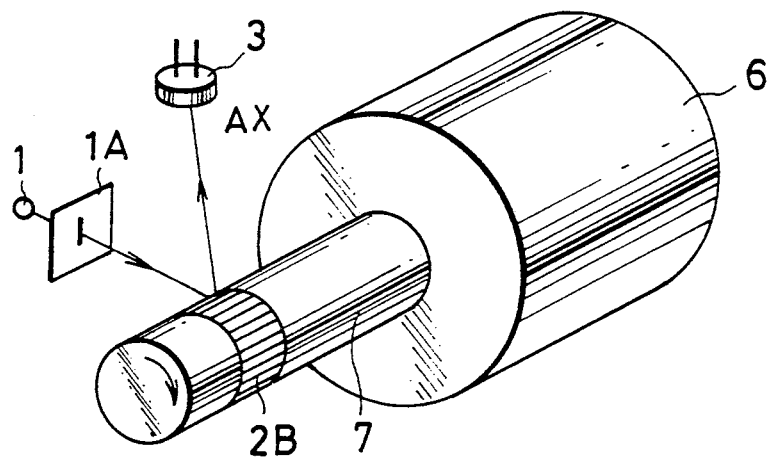
FIG. 6 is a view showing only a main portion of a moving amount detecting method in a third embodiment of the present invention.

FIG. 6 shows a moving amount detecting method in the third embodiment of the present invention. In FIG. 6, the moving amount detecting method is applied in the detection of a moving amount of a cylindrical diffraction grating 2B formed on a shaft 7 of a bearing portion 6 when this diffraction grating is rotated.

In these embodiments, the photodetector 3 is disposed on an optical axis AX. In this case, it is therefore necessary to set a condition $1/10 \leq d/\xi \leq 4$. A position shown by a broken line in each of FIGS. 4 and 5 is a position separated from the optical axis AX in which the contrast between light and shade of the shadow picture diffraction-interference pattern is stable. If the photodetector 3 is arranged in such a position, it is possible to preferably measure the moving amount even when the ratio $d/\xi$ is approximately set to 4.

Figure 7:
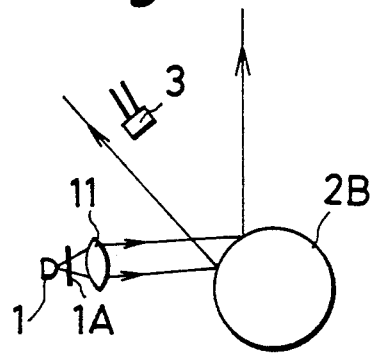
FIG. 7 is a view showing only a main portion of a moving amount detecting method in a fourth embodiment of the present invention.

As shown in FIG. 7, when the detected body is constructed by a cylindrical encoder 2B of a reflection type, a light beam transmitted through a small opening of a light-interrupting plate 1A is changed to a parallel light beam by a collimator lens 11 and can be irradiated onto the detected body 2B.

In the respective embodiments mentioned above, it is possible to use the light-interrupting plates 1B and 1C respectively shown in FIGS. 2b and 2c instead of the light-interrupting plate 1A.

As mentioned above, in a novel moving amount detecting method in the present invention, it is possible to form a very stable shadow picture diffraction-interference pattern by using a light source for emitting incoherent light. Therefore, the moving amount of a detected body can be detected with high accuracy.

In the present invention, the size of a monoperiodic structure of the detected body is increased in the shape of a shadow picture. Accordingly, the moving amount of the detected body can be detected even when a pitch of the monoperiodic structure of the detected body is greatly reduced. The monoperiodic structure having a small pitch can be realized by general methods such as a photo lithographic method, a method using interference of a laser beam, etc. The monoperiodic structure having a very small pitch can be also realized by a method proposed in Japanese Patent Application No. 63-210126 having the same inventors as this patent application. In this method, a grating pattern is written to a magnetic recording medium by using a magnetic head and is developed by a magnetic colloidal fluid. A thin transparent resin layer or a metallic evaporation film is formed on the developed pattern and the pattern developed by the colloidal fluid is fixed to this layer or film.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for detecting a moving amount of a detected body having a monoperiodic structure by irradiating the detected body with light emitted from a light source and detecting light reflected from the detected body or light transmitted therethrough with a photodetector, said method comprising the steps of:

emitting incoherent light from the light source through an opening of a light-interruption plate;
irradiating the detected body with said incoherent light to obtain a divergent transmitted or reflected light beam;

forming a shadow picture diffraction-interference pattern from said divergent transmitted or reflected light beam; and detecting a moving amount of the detected body by detecting with the photodetector a moving amount of said shadow picture diffraction-interference pattern caused by a movement of said detected body in a direction crossing the irradiated light beam.

2. A moving amount detecting method as claimed in claim 1, wherein a ratio $d/\xi$ of a longitudinal length d of a rectangular opening of the light-interrupting plate to a pitch $\xi$ of a diffraction grating arranged on a light-emitting side of the light-interrupting plate is in a range from 1/10 to 4.

3. A moving amount detecting method as claimed in claim 1, wherein a ratio $d/\xi$ of a major axis length d of an elliptical opening of the light-interrupting plate to a pitch $\xi$ of a diffraction grating arranged on a light-emitting side of the light-interrupting plate is in a range from 1/10 to 4.

4. A moving amount detecting method as claimed in claim 1, wherein a ratio $d/\xi$ of a diameter d of a circular opening of the light-interrupting plate to pitch $\xi$ of a diffraction grating arranged on a light-emitting side of the light-interrupting plate is in a range from 1/10 to 4.

5. A moving amount detecting method as claimed in claim 1, wherein the opening in the light-interrupting plate has any one of rectangular, elliptical and circular shapes.

6. A method for detecting a moving amount of a detected cylindrical body having a monoperiodic structure by irradiating the detected body with light emitted from a light source and detecting light reflected from the detected body with a photodetector, said method comprising the steps of:

emitting incoherent light from the light source through an opening of a light-interrupting plate;

irradiating said incoherent light through a collimator lens onto the detected body to obtain a divergent reflected light beam;

forming a shadow picture diffraction-interference pattern from said divergent reflected light beams; and detecting a moving amount of the detected body by detecting with the photodector a moving amount of said shadow picture diffraction-interference pattern caused by a movement of said detected body in a direction crossing the irradiated light beam.

7. A moving amount detecting method as claimed in claim 6, wherein the opening in the light-interrupting plate has any one of rectangular, elliptical and circular shapes.

* * * * *

UNITED STATES PATENT AND TRADEMARK OFFICE
CERTIFICATE OF CORRECTION

PATENT NO. : 5,148,019
DATED : September 15, 1992
INVENTOR(S) : Hiroshi Kobayashi, et al It is certified that error appears in the above-indentified patent and that said Letters Patent is hereby corrected as shown below:

On the title page, Item [73] Assignee: two other names should be added —Hiroshi KOBAYASHI and Haruhiko MACHIDA —.

Signed and Sealed this

Twenty-ninth Day of March, 1994

Attest:

BRUCE LEHMAN

Attesting Officer    Commissioner of Patents and Trademarks